(12) United States Patent
Kister et al.

(10) Patent No.: US 8,986,430 B2
(45) Date of Patent: Mar. 24, 2015

(54) LOW-ENERGY WASTE GAS COOLING USING DIRECT CONTACT CONDENSER

(75) Inventors: Henry Kister, Corona del Mar, CA (US); Richard B. Nielsen, Laguna Niguel, CA (US)

(73) Assignee: Fluor Technologies Corporation, Aliso Veijo, CA (US)

( * ) Notice: Subject to any disclaimer, the term of this patent is extended or adjusted under 35 U.S.C. 154(b) by 410 days.

(21) Appl. No.: 13/388,207

(22) PCT Filed: Aug. 3, 2009

(86) PCT No.: PCT/US2009/052569
§ 371 (c)(1),
(2), (4) Date: Apr. 16, 2012

(87) PCT Pub. No.: WO2011/016797
PCT Pub. Date: Feb. 10, 2011

(65) Prior Publication Data
US 2012/0186788 A1     Jul. 26, 2012

(51) Int. Cl.
| | | |
|---|---|---|
| B01D 47/12 | (2006.01) | |
| B01D 47/14 | (2006.01) | |
| B01D 53/18 | (2006.01) | |
| B01D 47/06 | (2006.01) | |
| B01F 3/04 | (2006.01) | |
| C01B 17/04 | (2006.01) | |
| B01D 5/00 | (2006.01) | |

(52) U.S. Cl.
CPC ............ C01B 17/0456 (2013.01); B01D 5/003 (2013.01)
USPC ................... 95/187; 95/199; 95/210; 95/223; 95/224; 95/225; 261/114.1; 96/297

(58) Field of Classification Search
CPC ........ B01D 47/12; B01D 47/14; B01D 53/18; B01D 47/06; B01F 3/04; B01F 3/04021; B01F 3/04078
USPC ................... 95/187, 199, 210, 223, 224, 225; 261/113, 114.1, 114.5; 96/243, 296, 96/297; 165/104.19
See application file for complete search history.

(56) References Cited

U.S. PATENT DOCUMENTS 2,797,151 A * 6/1957 Schnur et al. ................. 422/605
2,838,135 A   6/1958 Pilo et al.
3,624,984 A  12/1971 Ferrari et al.

(Continued)

FOREIGN PATENT DOCUMENTS

| CN | 1713950 | 12/2005 |
|---|---|---|
| DE | 3023812 | 1/1982 |

(Continued)

*Primary Examiner* — Robert A Hopkins
(74) *Attorney, Agent, or Firm* — Fish & Tsang, LLP (57) ABSTRACT

Heat is removed from a process liquid of a direct contact condenser in waste gas cooling using two separate and distinct cooling devices that provide cooled process liquid to at least two separate sections in the direct contact condenser. Most preferably, the sections are liquidly isolated and provide the heated process liquids to the respective cooling devices. However, in other embodiments, the sections are liquidly coupled to each other so to allow transfer of the process liquid from one section to another section. One of the two cooling devices uses a lower-cost or higher-availability coolant that the other. It is generally preferred that one of the cooling devices is an air cooler and that another one of the cooling devices employs a cooling medium other than air.

19 Claims, 3 Drawing Sheets

(56) References Cited

U.S. PATENT DOCUMENTS

| | | |
|---|---|---|
| 3,731,488 A | 5/1973 | Sasakura |
| 4,159,227 A | 6/1979 | Sundquist |
| 5,298,228 A | 3/1994 | Palomares et al. |
| 5,314,666 A | 5/1994 | Palomares et al. |
| 5,724,828 A | 3/1998 | Korenic |
| 5,925,291 A | 7/1999 | Bharathan et al. |
| 6,213,200 B1 | 4/2001 | Carter et al. |
| 2007/0125527 A1 | 6/2007 | Flik et al. |

FOREIGN PATENT DOCUMENTS

| | | |
|---|---|---|
| EP | 0170100 | 5/1986 |
| EP | 0738861 | 10/2002 |
| FR | 2749376 | 7/1998 |
| WO | 1999017862 | 4/1999 |
| WO | 2004045746 | 6/2004 |
| WO | 2009027493 | 3/2009 |

\* cited by examiner

LOW-ENERGY WASTE GAS COOLING USING DIRECT CONTACT CONDENSER

This application is a US national phase based on International Patent Application PCT/US2009/052569, which was filed Aug. 3, 2009.

FIELD OF THE INVENTION

The field of the invention is systems and methods of cooling process liquids, especially as it relates to cooling process water in direct contact condensers (DCC) for cooling tail gas in sulfur recovery plants.

BACKGROUND

In most common sulfur recovery plants, tails gas from a sulfur recovery unit is cooled by countercurrent heat exchange with a process liquid (typically water) in a DCC tower that includes a heat exchange section having a packed bed, a grid, trays, angle irons, or combination thereof to improve heat transfer. Hot gas rising through the packed bed cools down as it contacts the descending cooler process liquid, which is heated in turn by the hot gas. As the gas cools, condensable vapor condenses out of the gas, which further heats the process fluid. The heated process liquid is then collected at the bottom of the bed by a collector device, usually a chimney tray. From there, the heated process liquid is pumped through external heat exchangers that cool the process liquid, which is then returned to the top of the tower.

It is generally preferred to minimize the temperature of the gas leaving the top of the tower as hydrogen sulfide is more effectively absorbed in a downstream amine unit, and as the cooler treated gas comprises less water that would otherwise dilute the amine solvent. In most known DCC processes, a narrow approach (typically 5° F. or less) is taken between the outlet gas temperature of the DCC and the incoming cooled process liquid, which typically requires the temperature of the cooled returned low process liquid to be between about 95-115° F. To achieve such cooling of the process liquid, pumparound exchangers usually use cooling media such as water or ambient air. Where there is a small cost differential between water cooling and air cooling, and water is readily available, water cooling is often preferred. On the other hand, where air cooling is cheaper or water is not readily available, air it is typically preferred as the coolant. However, air cooling is often insufficient to provide the desired tower outlet gas temperature, especially where the DCC is located in a hot climate zone. In such cases, an air cooler can be operated serially with a water cooler such that the air cooler is used to remove the heat from the process liquid at the warmer temperature and that the water cooler cools the process liquid to the desired temperature. Unfortunately, as availability of water in sufficient quantities for water cooling is often problematic in hot climate zones, coolers using external refrigerants (e.g., propane) are often needed.

Where suitable quantities of water for water cooling are not available or expensive, or where an external refrigerant is used, there is an incentive to maximize air cooling of the process liquid. For example, the size and the duty of the air cooler can be increased. However, upsizing is typically limited by the approach temperature difference between the air and the process liquid. Most DCCs need to maintain a 15-20° F. approach between the air temperature and the temperature of process water leaving the cooler. Reducing the approach beyond this range leads to rapidly escalating air cooler size and cost.

Alternatively, the pumparound circulation rate can be reduced, which leads to higher process liquid temperatures leaving the packed bed. At these hotter temperatures, the heat can be removed from the process liquid by air rather than refrigerant. There is a strong dependence between the process water outlet temperature leaving the bed and the fraction of heat duty picked up by the air cooler. The hotter the bed outlet temperature, the higher the fraction of heat picked up by air cooling. However, as the pumparound circulation rate is reduced, the temperature of the process liquid rises throughout the bed and quickly approaches the gas temperature. As a result of the so reduced temperature difference, heat exchange in the bed is reduced and typically increases the bed height requirements. With large diameter towers, this additional bed height is expensive.

Worse yet, as the temperature difference between the water and gas in the packed bed diminishes, the bed becomes more prone to gas and/or liquid maldistribution, thereby leading to unreliable heat transfer performance. Maldistribution generates radial variations in liquid and gas temperature in the bed. When the temperature difference between gas and liquid is small, even small radial temperature variations can bring heat transfer to a halt or at least cause a major reduction of heat transfer rates. The high sensitivity to maldistribution reduces tower reliability and renders designs very unforgiving, and it is therefore generally preferred to keep the difference between the water leaving the bed and the gas entering (the "inlet approach") to no less than 10° F. However, even such inlet approach requires close attention to liquid and gas distribution, and often results in substantial capital requirements for suitable distribution equipment. Even so, lack of robustness of operation may cause significant performance problems in case of corrosion, fouling, or other abnormal circumstances.

Therefore, while various systems and methods of cooling process liquids in sulfur recovery plant direct contact condensers are known in the art, all or almost all of them suffer from one or more disadvantages, especially where the direct contact condenser is located in a relatively hot and arid climate. Thus, there is still a need for improved direct contact condensers in sulfur recovery plants.

SUMMARY OF THE INVENTION

The present inventive subject matter is directed to various methods and configurations for direct contact condensers for waste gas cooling. As used herein, the term "waste gas" refers to a gas that is to be vented to the atmosphere from a process unit, a heater, or a turbine. Most typically the gas requires at least one treatment step to remove one or more components (e.g., carbon dioxide, hydrogen sulfide, etc.) prior to venting the gas to the atmosphere. In this context, it should be noted that many waste gases are formed at relatively high temperatures (e.g., at 150° F., or higher) from a waste gas source such as a heater or a turbine, and are therefore not suitable for direct use in the treatment step to remove the undesired component(s). For example, an amine absorption unit is typically operated at temperatures of between 95-115° F., whereas many waste gases are produced at significantly higher temperatures (e.g., sulfur recovery plant tail gas has often a temperature of 390° F.).

In especially preferred aspects of waste gas cooling, refrigeration duty is significantly reduced by splitting the direct contact bed into two distinct sections having individual direct contact beds wherein one section receives cooled process liquid from a first cooling device (e.g., air cooler), and wherein another section receives cooled process liquid from a second cooling device (e.g., cooler with external refrigerant). Most preferably, first and second cooling devices are distinct such that the first cooling device operates with a first coolant, the second cooling device operates with a second coolant, wherein the first coolant has a lower cost and/or a higher availability that the second coolant.

It should be particularly appreciated that configurations and methods contemplated herein advantageously allow uncoupling of the air/refrigerant duties from the pumparound circulation rate, and so enable operation at increased circulation rates, which in turn allows for an increased temperature approach at the bottom of each section and a small temperature approach at the top of each section. While it is typically preferred to maintain the sections liquidly isolated with respect to the process liquid, it should be noted that partial or even complete liquid coupling is also deemed suitable, especially to counteract abnormal process conditions.

In one especially preferred aspect of the inventive subject matter, a direct contact condenser for counter-current contact of a waste gas (e.g., tail gas of a sulfur recovery plant) with a process liquid includes a first section that is liquidly coupled to a second section to allow the waste gas to upwardly move from the first section to the second section. Contemplated devices further include a first cooling device that is liquidly coupled to the first section and provides a first cooled process liquid to the first section, and a second cooling device that is liquidly coupled to the second section and provides a second cooled process liquid to the second section. Most preferably, a first and a second conduit are liquidly coupled to the direct contact condenser and configured to provide first and second heated process liquids to the first and second cooling devices, respectively. In such condensers, first and second cooling devices are distinct (e.g., an air cooler, and a cooling device using a refrigerant other than air).

In certain preferred embodiments, the direct contact condenser further has a collection device between the first and second sections to allow withdrawal of the second heated process liquid from the second section. In such devices, it is generally preferred that the first cooling device is sized and dimensioned to allow operation of the first section with a narrow temperature approach at the top and a wide temperature approach at the bottom, and that the second cooling device is sized and dimensioned to allow operation of the second section with a narrow temperature approach at the top and a wide temperature approach at the bottom. In such devices, a first and a second pump are included and preferably configured to allow different pump rates of the first and second heated process liquid to the first and second cooling devices, respectively. Where desired, a valved conduit may be included to provide a liquid bypass between the first and second sections for the process liquid. Additionally, it should be noted that first and second conduits may be liquidly coupled to each other.

In other preferred embodiments, the first and second sections may be liquidly coupled to each other to allow at least a portion (and more preferably all) of the process liquid to downwardly flow from the second section to the first section. In such devices, a single pump and associated conduits will be configured to allow operation of the DCC in conventional manner and/or in a combination of the conventional manner as depicted in Prior Art FIG. 1 and in a manner as depicted as in FIG. 2. Therefore, the first and second cooling devices may be coupled to each other to allow serial operation. Where desired, first and second control units can be implemented and configured to control flow of the first and second process liquid streams to the first and second sections, respectively.

Therefore, and viewed from a different perspective, a method of providing counter-current contact of a waste gas with a process liquid in distinct first and second sections to produce respective first and second heated process liquids will include a step of cooling a heated process liquid in distinct first and second cooling devices to produce respective first and second cooled process liquids and another step of providing the first and second cooled process liquids to the first and second sections, respectively.

Additionally, in other aspects of the inventive subject matter it is generally preferred to include a collection device that separates the first and second sections and to allow selective withdrawal of the second heated process liquid from the second section. It is further preferred that the first and second sections are operated with a narrow temperature approach at the top and a wide temperature approach at the bottom. In other aspects of the inventive subject matter, the first and second sections may be liquidly coupled to each other to allow at least a portion of the process liquid to flow from the second section to the first section. Where desirable, first and second control units may be included to control flow of the first and second process liquids to the first and second sections, respectively.

Various objects, features, aspects and advantages of the present invention will become more apparent from the following detailed description of preferred embodiments of the invention.

BRIEF DESCRIPTION OF THE DRAWING

Prior art

DETAILED DESCRIPTION

The inventors have discovered that external refrigeration can be minimized by splitting each of the direct-contact section and the pumparound circuit into two sections. Preferred configurations provide for an air-cooled bottom pumparound circuit and a top pumparound circuit that uses water or other non-air refrigerant. Viewed from a different perspective, it should therefore be appreciated that one cooling device operates with a coolant that is less expensive and/or has higher availability, while the other cooling device operate with distinct coolant. Thus, for example, by decoupling the pumparound circuits, some of the refrigeration duty normally required of the cooling device using external refrigerant can be shifted to the air cooler. Because of the cost difference between air and other refrigerants, such shift results in significant cost-savings.

Additionally, splitting the pumparound circuit allows for the circulation rate at each section to be increased (instead of decreased as in the prior art) to thereby maximize air cooling. Thus, for each section, a larger approach (e.g., 15° F.) can be employed at the bottom, which permits a narrow approach (e.g., 5° F.) between the incoming process liquid and the waste gas (typically tail gas) at the top of each section.

Furthermore, the larger approach as well as the splitting of the bed will reduce the number of heat transfer stages per bed, making the direct contact condenser far more robust for handling gas and liquid maldistribution as well as handling abnormal conditions such as fouling, corrosion, and upsets. Thus, it should be appreciated that splitting the pumparound circuits makes the direct contact condenser significantly more reliable and more robust.

Figure 1:
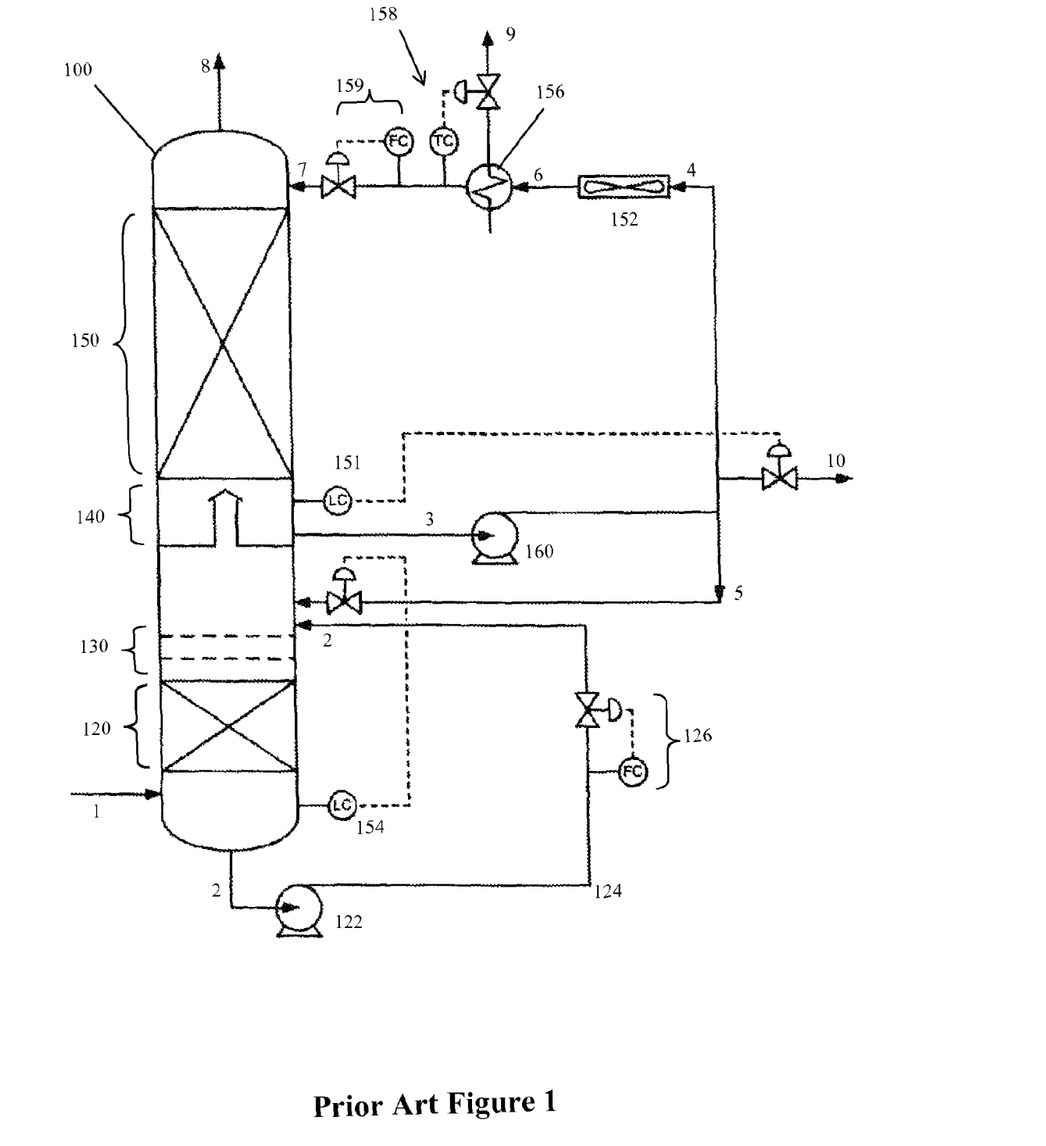
FIG. 1 is a schematic illustration of a conventional direct contact condenser.

Prior art FIG. 1 depicts a known configuration of a direct contact condenser 100 having a single section 150. A waste gas 1 is fed into the direct contact condenser 100 at a flow rate of about 620,000 lb/h and a temperature of about 390° F. The waste gas 1 flows to the lower desuperheating section 120 where it is desuperheated by vaporizing a small portion of a circulating water stream. The bottom liquid 2 has a temperature of about 167° F. The liquid 2 is pumped by lower pump 122 at a flow rate of about 1,400,000 lb/h through a lower conduit 124 and recirculated into the top of the lower desuperheating section 120. A lower flow controller and control valve 126 is coupled to the lower conduit 124 to regulate the flow of the liquid 2 to the lower desuperheating section 120.

From the lower desuperheating section 120, the waste gas flows through trays 130. At least a portion of the gas flows past collection tray 140 to the condensing section 150, and has a temperature of about 167.4° F.

The condensing section 150 allows counter-current contact of the waste gas with a cooled process liquid 7. The resulting cooled waste gas 8 exits an upper portion of the direct contact condenser 100 at a temperature of about 119.3° F. and a flow rate of about 534,000 lb/h. The counter-current contact with the waste gas heats the cooled process liquid 7 to a temperature of about 157.3° F., and the resulting heated process liquid 3 is collected at collection tray 140. Some water vapor is condensed out of the ascending waste gas and adds to the collected heated process liquid.

Pump 160 pumps a portion 4 of the heated process liquid 3 at a flow rate of about 2,900,000 lb/h to air cooler 152. A second portion 5 can be pumped to the desuperheating section 120. The flow rate of the second portion 5 is controlled by a level control unit 154 in response to changes in the liquid level at the bottom of the desuperheating section 120. In addition, a condensate stream 10, which contains the water vapor condensed in the upper condensing section 150 less the liquid 5 sent to the desuperheating section 120 is pumped externally from the circuit at a flow rate of about 84,000 lb/h to maintain a constant level on the collection tray. The flow of the condensate stream 10 is regulated by level control unit 151 that monitors the liquid level at the collection tray 140.

The air cooler has a cooling duty of about 54.4 MMBtu/h, and produces a cooled process liquid 6 having a temperature of about 138.2° F. The cooled process liquid 6 flows from air cooler 152 to a second cooling device 156, which has a refrigeration duty of about 69.7 MMBtu/h. The second cooling device operates using an external refrigerant stream 9, and produces a cooled process liquid 7 having a temperature of about 114.6° F. The flow rate of the stream 9 is controlled by temperature control unit 158. The cooled process liquid 7 is fed to the condensing section 150, in an amount regulated by flow control unit 159.

Thus, the single pumparound circuit operates the section with a top temperature approach of about 5° F., and a bottom temperature approach of about 10° F. Having these narrow temperature approaches at both ends of the condensing section can be problematic, particularly if the condensing section has any maldistribution. In addition, the single pumparound circuit limits the amount of heat that can be expelled from the air cooler, especially in hot climates and in arid regions. As a result, the second cooling device that employs a much more expensive refrigerant (typically an external refrigerant) must take up more of the cooling duty, which significantly adds to the cost of the process due to the increased need for external refrigerants.

Figure 2:
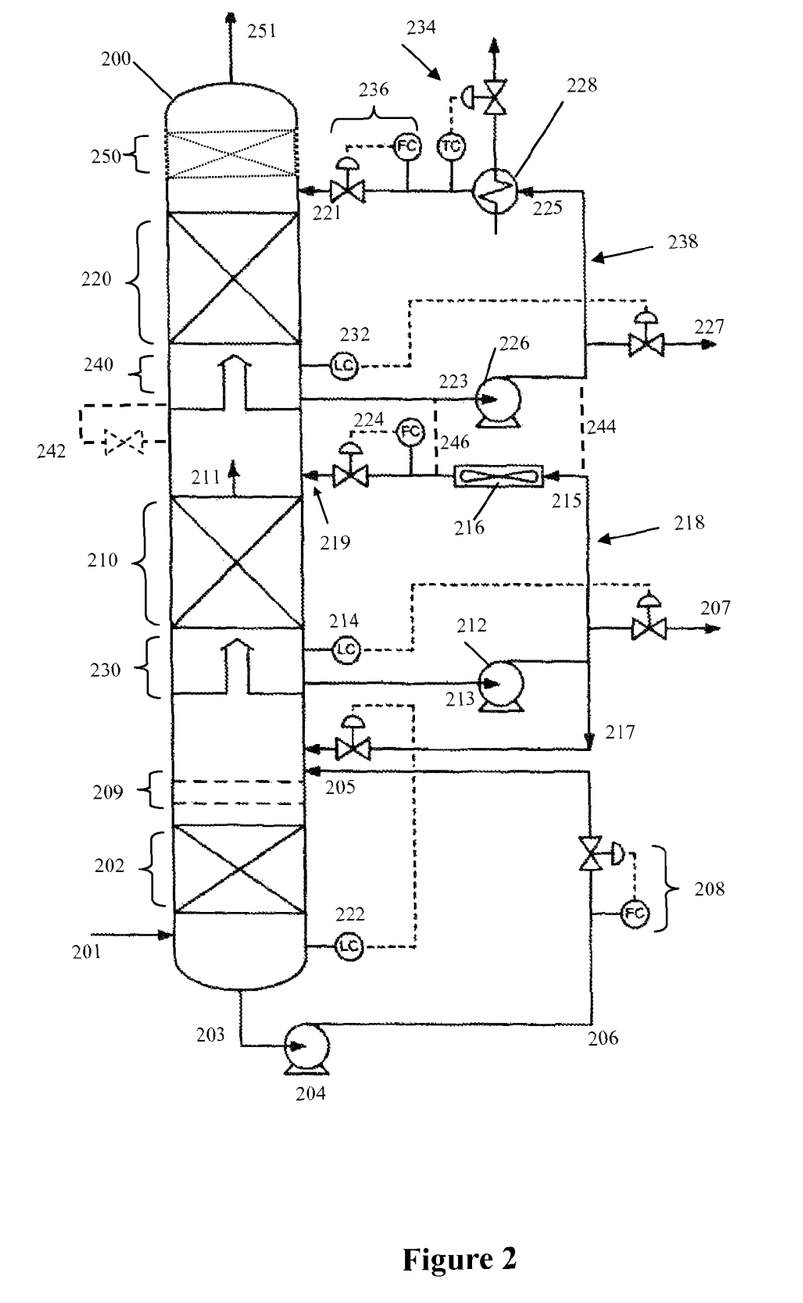
FIG. 2 is a schematic illustration of a first exemplary configuration for a direct contact condenser according to the inventive subject matter.

In contrast, particularly preferred configurations of a direct contact condenser 200 as depicted in FIG. 2 have a first section 210 separated from a second section 220 by second collection tray 240. Each of the sections receives a cooled process liquid having different temperatures. Most typically water is used as the process liquid, however, other suitable process liquids are also contemplated.

The first and second sections typically contain a packed bed, but could alternatively contain grids, trays, angle irons, combinations thereof, or other commercially suitable internal configurations. In addition, though the sections are shown arranged vertically, the sections could alternatively be disposed laterally or in any other position relative to one another.

A waste gas 201 (typically a tail gas from a sulfur recovery unit) is fed into the direct contact condenser 200 at a flow rate of about 620,000 lb/h and a temperature of about 390° F. Preferred waste gases include, for example, tails gas from a sulfur recovery unit, though any commercially suitable waste gases are contemplated.

At least a portion of the waste gas 201 is desuperheated in desuperheating section 202 by vaporizing a small portion of circulating water stream 205. The bottom liquid 203 is collected at the bottom of the direct contact condenser 200, and has a temperature of about 169° F. This bottom liquid 203 is pumped by lower pump 204 at a flow rate of about 1,400,000 lb/h through a lower conduit 206 to be recirculated into the top of the desuperheating section 202. A lower flow control valve 208 is coupled to the lower conduit 206 to regulate the flow of the liquid 205 to the desuperheating section 202. With respect to operating conditions of the desuperheating section 120, it should be noted that all known and conventional conditions are deemed suitable.

From the desuperheating section 202, the waste gas flows through optional trays 209, then at least a portion of the gas flows through first collection tray 230 to the first condensing section 210, and has a temperature of about 167.7° F.

The first condensing section 210 allows counter-current contact of the waste gas with a first cooled process liquid 219. Such contact cools the waste gas and heats the process liquid, as the gas passes through the first condensing section and contacts with the cooler first cooled process liquid 219. The resulting cooled waste gas 211 exits the first section 210 at a temperature of about 143.3° F., and flows through second collector 240 to the second condensing section 220. Some water vapor is condensed out of the ascending gas and adds to the heated process liquid.

After the counter-current contact in the first section, the heated process liquid 213 has a temperature of about 154° F., and is collected at the bottom of the first section 210 by first liquid collector 230, which is preferably a chimney tray. From the first liquid collector 230, the first pump 212 pumps at least a portion (typically most) of the heated process liquid 215 at a flow rate of about 5,500,000 lb/h through a first conduit 218 to a first cooling device 216. While the first cooling device is preferably an air cooler, any commercially suitable cooling device could be used. The first cooling device has a cooling duty of about 85.9 MMbtu/h.

A second portion 217 of the heated process liquid 213 can be pumped to the lower desuperheating section 202, as needed. The flow rate of the second portion 217 can be controlled by a level control unit 222 that monitors the liquid level at the bottom of the desuperheating section 202. Because most of the heat that is removed from the waste gas in direct counter-current contact is typically latent heat due to condensation of water vapor contained in the waste gas, a first condensate stream 207 is preferably removed from the pumparound at a rate that equals the water condensation rate less the second portion 217. This removal of the stream 207 can be monitored by level control unit 214 that monitors the liquid level at the first collector 230. In some waste gas cooling applications, desuperheating section 202 and trays 230 may be omitted or combined with the first condensing section 210. Such combination will eliminate the lower circulation circuit including pump 204, conduit 206, and controller 208. In such case, collection device 230 may be eliminated and liquid leaving the first condensing section 210 will descend to the bottom of the direct contact condenser 200. Pump 213 will then pump the liquid from the bottom of the direct contact condenser 200 and will send the bottom liquid 203 to the first cooling device 216.

The first cooling device 216 cools the portion 215 of the heated process liquid 213 to a temperature of about 138.2° F. to produce a first cooled process liquid 219. At least a portion (typically most) of the first cooled process liquid 219 is fed to the first section 210, with the flow rate preferably regulated by flow control unit 224.

The second condensing section 220 provides for counter-current contact of the cooled waste gas from the first section 210 with a second cooled process liquid 221. The resulting cooled waste gas exits an upper portion of the direct contact condenser 200 as outlet gas stream 251. The outlet gas stream has a temperature of about 119.3° F. and a flow rate of about 534,000 lb/h. The second cooled process liquid 221 preferably has a temperature of 115° F. Optionally, the direct contact condenser 200 could include a third section 250, and even further additional sections (not shown), to provide additional counter-current contact of the waste gas with a process liquid. Such sections are contemplated to be disposed in any suitable location.

The second cooled process liquid 221 is heated during counter-current contact in the second section 220 to a temperature of about 128.4° F. The resulting second heated process liquid 223 is collected at second collector 240. Some water vapor is condensed out of the ascending gas and adds to the collected heated process liquid. Second pump 226 pumps at least a portion 225 of the second heated process liquid at a flow rate of about 2,900,000 lb/h through second conduit 238 to a second cooling device 228. Non-air refrigerants are employed in second cooling device 228, and any commercially suitable refrigerants could be used. The flow of refrigerant through the second cooling device 228 can be controlled by temperature control unit 234.

Because of the large cooling duty of the first cooling device (85.9 MMBTU/h), the refrigeration duty of the second cooling device can be minimized, preferably to about 39.4 MMBtu/h from the refrigeration duty required in the configuration of FIG. 1 (69.7 MMBbtu/h). This advantageously results in a decreased refrigeration duty of about 30.3 MMBtu/h, and allows the second cooling device to be decreased in size, bringing additional cost benefits.

A second condensate stream 227 that contains the condensed water vapor from from the second section 220 can be removed from the second conduit, and the flow of the stream 227 can be controlled by level control unit 232, which monitors the liquid level at the second collector 240.

The second heated process liquid is cooled in the second cooling device 228 to a temperature of about 115° F., and at least a portion (typically most) of this second cooled process liquid 221 is fed to the second section 220 in an amount that can be regulated by flow control unit 236.

Optionally, a conduit 242 that is preferably valved could be provided to allow at least a portion of the process liquid to bypass the collector 240 and flow to the first section 210. Such liquid coupling of the first and second sections will diminish the benefits of the direct contact condenser over the prior art configurations, but such couplings add flexibility and can address abnormal operating conditions, and thereby provide a more stable and reliable process. Thus, for example, should a pump fail, such couplings could provide a connection that allows process liquid to be diverted as needed to compensate for the reduction of process liquid in other areas of the direct column condenser.

Alternatively or additionally, a third 244 and/or fourth conduit 246 (each preferably valved) could be provided to liquidly couple the first 218 and second conduits 238. Thus, for example, as shown in FIG. 2, the fourth conduit 246 could be disposed to allow a portion of the first cooled process liquid 219 to be diverted to the second conduit 238. However, such additional conduits could be disposed throughout the system as needed such as to provide various alternative configurations should a pump or cooling device fail.

By decoupling the pumparound circuits, and providing each circuit with a pump, the flow rates through each circuit can be varied to optimally reject heat in each of the circuits. Thus, by increasing the flow rate using the first pump 212, the cooling duty of the air cooler could be increased and thereby shift some of the duty from the second cooling device to the first cooling device.

Comparing the process schemes of FIGS. 1 and 2, the refrigerant heat duty is reduced by a factor of 1.77, from 69.7 MMBtu/h in the prior art configuration to 39.4 MMBtu/h in the configuration shown in FIG. 2. This reduction primarily results from the transfer of refrigeration duty from the second cooling device to the first cooling device. For example, using an air cooler as the first cooling device in FIG. 2, 30.3 MMBtu/h is removed that normally would have required removal by refrigeration in the second cooling device, as shown in FIG. 1. Such reduction advantageously slashes energy requirements, as well as reduces the cost of the cooling devices required for operation.

Furthermore, the configurations shown in FIG. 2 increase the temperature approach at the bottom of the sections from 10° F. (of the configuration of FIG. 1) to 15° F. This higher approach makes the heat transfer performance of each section far more robust to maldistribution and operating problems, and therefore, more reliable than the configuration of FIG. 1. In addition, the higher approach allows the section to have a decreased height.

The decreased height of each bed offers the additional benefit of making the DCC more robust to the adverse effects of gas and liquid maldistribution as well as to consequences of abnormal operation such as fouling, corrosion, and/or upsets, rendering such configurations more flexible and forgiving.

The larger heat recovery from the first section 210 in the first cooling device 216 may in some cases provide incentive to add another cooling device which will recover some, even most of the heat in this section by a heat recovery coolant, such as a process feed preheater, leading to additional benefits.

In further contemplated embodiments, the second collector could be removed entirely, contain pipes allowing gravity downflow of the collected liquid to the liquid distributor for the first section 210, and allow all of the process liquid to be collected at the first collector. Such embodiments continue to provide the advantages as discussed above. An exemplary embodiment of these alternative configurations is shown in FIG. 3.

Figure 3:
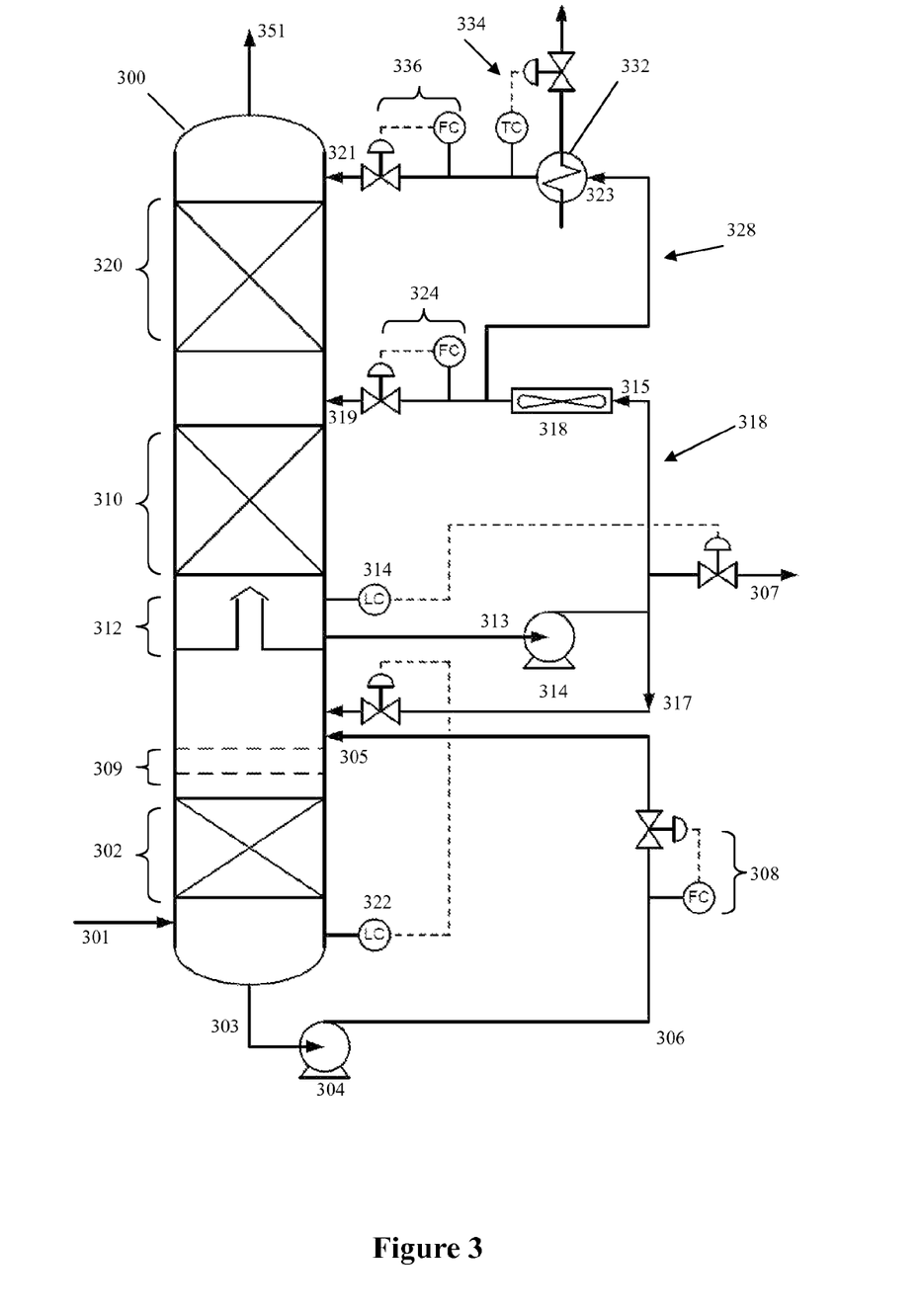
FIG. 3 is a schematic illustration of a second exemplary configuration for a direct contact condenser according to the inventive subject matter.

FIG. 3 depicts an alternative embodiment of the direct contact condenser of FIG. 2, in which the cooling devices 318 and 323 operate in series. In such configuration, it should be appreciated that cooling device 323 has a reduced duty by virtue of pre-cooling of the liquid in cooling device 318. It should be appreciated that such configuration eliminates one collector and one pump as compared to the configuration of FIG. 2, but transfers significantly less cooling duty from the refrigeration cooler 323 to the air cooler 318. This is because the temperature of the process liquid 323 into cooler 332 is significantly higher than that of the process liquid temperature 225 into cooler 228. With respect to the remaining numerals in FIG. 3, the same considerations for like components with like numerals of FIG. 2 apply.

Similarly to the configurations shown in FIG. 2, the configuration in FIG. 3 allows the first cooling device to be configured to operate each of the first and second sections with a narrow temperature approach at the top and a wide temperature approach at the bottom.

Thus, it should be appreciated that in a counter-current contact process as described above, various and significant advantages (e.g., increase in flow rate of the process liquid, wide temperature approach at the bottom of each section, reduction of energy requirements for cooling, etc.) can be obtained. Most preferably, such advantages are achieved by cooling the heated process liquid from the first and/or second sections in separate cooling devices to produce respective first and second cooled process liquids, which are then reintroduced into the respective first and second sections. While it is generally preferred that a collector separates the first and second sections with respect to the process liquid, providing of at least part or even all of the process liquid from the second to the first section is also deemed suitable. Of course, it should be noted that the availability of various cooling media will at least in part determine the type of cooling device that is being used. However, it is generally preferred that the first cooling device is an air cooler, and the second cooling device is a cooler that uses an external non-air refrigerant. For example, suitable alternative cooling devices include chilled water exchangers, sea-water exchangers, fresh-water exchangers, coolers operating with refrigerants such as single hydrocarbons, multi-component hydrocarbons, halogenated hydrocarbons, ammonia, etc.

It is still further noted that heretofore known direct contact condensers were generally the preferred solution for waste gas treatment as that solution required only a single pump rather than the addition of a second pump and associated piping and flow control. Moreover, as most direct contact condensers are located in an environment where air is relatively cool and/or water is abundant, there is little difficulty in achieving the desired lowest temperature of the process fluid. Consequently, the benefits of having two distinct process fluid circuits have not been appreciated. However, where the air is hot and water is unavailable or expensive as cooling medium, and refrigerant is required to perform a significant portion of the cooling duty, the advantages of the inventive subject matter presented herein will be readily apparent.

Moreover, it should be appreciated that the waste gas in preferred configurations and methods is a tail gas from a sulfur recovery unit or waste gas from a carbon dioxide capture process rather than a gas for which a close compositional character must be maintained. Consequently, all or almost all of the conventional cooling schemes have previously been deemed satisfactory. However, and as pointed out before, where the ambient temperature is relatively high (and especially where water is less readily available or expensive as cooling medium) heretofore known devices required operation with large amounts of external refrigerant.

Most currently known direct contact condensers are in non-waste gas services where close compositional character must be maintained and are therefore primarily configured to achieve best separation and heat removal between streams that are recovered as products from the condensers. In contrast, direct contact condensers in waste gas services are primarily configured to remove low-grade heat by ambient coolants, supplemented by refrigerants where ambient temperatures are relatively high.

Thus, specific embodiments and applications of low-energy direct contact condensers for waste gas cooling have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A direct contact condenser configured to allow cooling of a waste gas in counter-current contact with a process liquid, comprising:
   a feed gas conduit coupled to the direct contact condenser and a waste gas source and configured to feed the waste gas to the direct contact condenser, wherein the waste gas source is a sulfur recovery unit, a carbon dioxide capture unit, a heater, or a turbine;
   wherein the direct contact condenser further comprises a first section liquidly coupled to a second section, such that the waste gas moves from the first section to the second section;
   a first cooling device liquidly coupled to the first section, and configured to provide at least a portion of a first cooled process liquid to the first section at a first rate via a first pump;
   a second cooling device liquidly coupled to the second section, and configured to provide at least a portion of a second cooled process liquid to the second section at a second rate via a second pump;
   wherein first and second pumps are configured to allow pumping of the first and second cooled process liquids at different pump rates, respectively;
   wherein first and second cooling devices are distinct, wherein the first cooling device is an air cooler, and wherein the waste gas is a gas from a process unit, a heater, or a turbine that is vented to the atmosphere; and
   first and second conduits liquidly coupled to the direct contact condenser and configured to provide first and second heated process liquids to the first and second cooling devices, respectively.

2. The direct contact condenser of claim 1, further comprising a collector disposed between the first and second sections, and configured to allow withdrawal of the second heated process liquid from the second section.

3. The direct contact condenser of claim 2, wherein the first cooling device is configured to allow operation of the first section with a narrow temperature approach at the top and a wide temperature approach at the bottom, and wherein the second cooling device is configured to allow operation of the second section with a narrow temperature approach at the top and a wide temperature approach at the bottom.

4. The direct contact condenser of claim 2, further comprising a valved conduit configured to provide a liquid bypass between the first and second sections for process liquid.

5. The direct contact condenser of claim 2, wherein first and second conduits are liquidly coupled to each other.

6. The direct contact condenser of claim 1, wherein the first and second sections are liquidly coupled to allow at least a portion of the process liquid to flow from the second section to the first section.

7. The direct contact condenser of claim 6, wherein substantially all of the process liquid flows to the first section.

8. The direct contact condenser of claim 6, wherein the first cooling device is an air cooler and wherein the second cooling devices is configured to use a refrigerant other than air.

9. The direct contact condenser of claim 6, wherein the first and second cooling devices are coupled to each other to allow serial operation.

10. The direct contact condenser of claim 6, further comprising first and second control units configured to control flow of the first and second process liquids to the first and second sections, respectively.

11. The direct contact condenser of claim 1, further comprising a third section.

12. The direct contact condenser of claim 1, wherein the first cooling device is configured to operate with a first coolant, wherein the second cooling device is configured to operate with a second coolant, and wherein the first coolant has at least one of a lower cost and a higher availability that the second coolant.

13. The direct contact condenser of claim 12, wherein the first cooling device is an air cooler, and wherein the second cooling device is configured to use a refrigerant other than air.

14. A method of cooling a waste gas from a sulfur recovery unit, a carbon dioxide capture unit, a heater, or a turbine in counter-current contact with a process liquid in first and second sections to produce respective first and second heated process liquids, comprising:
    cooling a heated process liquid in first and second cooling devices to produce respective first and second cooled process liquids, wherein the first cooling device is an air cooler;
    providing the first and second cooled process liquids to the first and second sections, respectively; and
    wherein the step of providing is performed under conditions that allows delivery of the first and second cooled process liquids at different flow rates.

15. The method of claim 14, wherein the first and second cooling devices are distinct, and wherein the first cooling device operates with a first coolant and wherein the second cooling device operates with a second coolant, and wherein the first coolant has at least one of a lower cost and a higher availability that the second coolant.

16. The method of claim 14, further comprising the step of providing a collection device configured to separate the first and second sections and to allow selective withdrawal of the second heated process liquid from the second section.

17. The method of claim 16, wherein the first section is operated with a narrow temperature approach at the top and a wide temperature approach at the bottom, and wherein the second section is operated with a narrow temperature approach at the top and a wide temperature approach at the bottom.

18. The method of claim 14, wherein the first and second sections are liquidly coupled to allow at least a portion of the process liquid to flow from the second section to the first section.

19. The method of claim 18, further comprising the step of providing first and second control units configured to control flow of the first and second process liquid liquids to the first and second sections, respectively.

* * * * *